US012358143B2

(12) United States Patent
Desai et al.

(10) Patent No.: US 12,358,143 B2
(45) Date of Patent: Jul. 15, 2025

(54) TETHER USAGE FOR ROBOTIC PACKAGE DELIVERY OR ITEM HANDLING

(71) Applicant: Amazon Technologies, Inc., Seattle, WA (US)

(72) Inventors: Vaibhav Desai, Seattle, WA (US); Alan Baird, Seattle, WA (US); Rohit Malshe, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 18/079,285

(22) Filed: Dec. 12, 2022

(65) Prior Publication Data

US 2024/0190007 A1 Jun. 13, 2024

(51) Int. Cl.
*B25J 9/16* (2006.01)
*B60P 1/64* (2006.01)
*B65B 61/14* (2006.01)
*B65D 25/22* (2006.01)

(52) U.S. Cl.
CPC ........... *B25J 9/1687* (2013.01); *B60P 1/6409* (2013.01); *B65B 61/14* (2013.01); *B65D 25/22* (2013.01)

(58) Field of Classification Search
CPC ........ B60P 1/6409; B25J 9/1687; B25J 15/00; B65B 61/14; B65D 25/22
See application file for complete search history.

(56) References Cited

U.S. PATENT DOCUMENTS

| 1,524,399 | A | * | 1/1925 | Krueger | B65D 5/46008 |
| | | | | | 16/407 |
| 2,236,681 | A | * | 4/1941 | Goldschmidt | B65D 75/56 |
| | | | | | 229/117.26 |
| 3,031,359 | A | * | 4/1962 | Blank | C09J 7/20 |
| | | | | | 206/820 |
| 9,089,969 | B1 | * | 7/2015 | Theobald | B25J 9/1687 |
| 9,102,055 | B1 | * | 8/2015 | Konolige | G06T 7/60 |
| 10,759,060 | B1 | * | 9/2020 | Larsen | H01B 13/01272 |
| 2002/0121456 | A1 | * | 9/2002 | Mannion | B65D 43/0218 |
| | | | | | 211/113 |

(Continued)

FOREIGN PATENT DOCUMENTS

JP H0671583 B2 9/1994

OTHER PUBLICATIONS

USPS; "Preparing Packages" at USPS.com; Nov. 12, 2020 (Year: 2020).*

(Continued)

*Primary Examiner* — Stephen Holwerda
(74) *Attorney, Agent, or Firm* — Kilpatrick Townsend & Stockton LLP

(57) ABSTRACT

A system can function relative to an item, a tether, and a robotic manipulator. The tether can correspond to a loop or other structure that can be mountable or mounted in an installed state in which the tether is secured with the item to facilitate lifting the item by lifting of the tether. The robotic manipulator can include a robotic end effector engageable with the tether in the installed state. The robotic end effector can be configurable to an engaged state in which the tether is coupled with the robotic end effector. The robotic manipulator in the engaged state can be operable to move the item by lifting of the tether in the installed state.

14 Claims, 7 Drawing Sheets

(56) References Cited

U.S. PATENT DOCUMENTS

| | | | | |
|---|---|---|---|---|
| 2006/0185993 | A1* | 8/2006 | Wilskey | B65D 85/187 |
| | | | | 53/449 |
| 2015/0251314 | A1* | 9/2015 | Nammoto | B25J 9/1687 |
| | | | | 700/259 |
| 2016/0037748 | A1* | 2/2016 | Taneja | A01K 5/0114 |
| | | | | 119/51.01 |
| 2021/0268648 | A1* | 9/2021 | Park | B25J 15/0066 |
| 2022/0339794 | A1 | 10/2022 | Golan et al. | |

OTHER PUBLICATIONS

Application No. PCT/US2023/081454, International Search Report and Written Opinion, Mailed On Apr. 22, 2024, 11 pages.

* cited by examiner

TETHER USAGE FOR ROBOTIC PACKAGE DELIVERY OR ITEM HANDLING

BACKGROUND

Items may be moved from one location to another, such as for delivery at a particular location. Typically, delivering items is accomplished by human personnel. Recently, industry efforts have been made to consider robotic devices.

BRIEF DESCRIPTION OF THE DRAWINGS

Various embodiments in accordance with the present disclosure will be described with reference to the drawings, in which.

DETAILED DESCRIPTION

Figure 1:
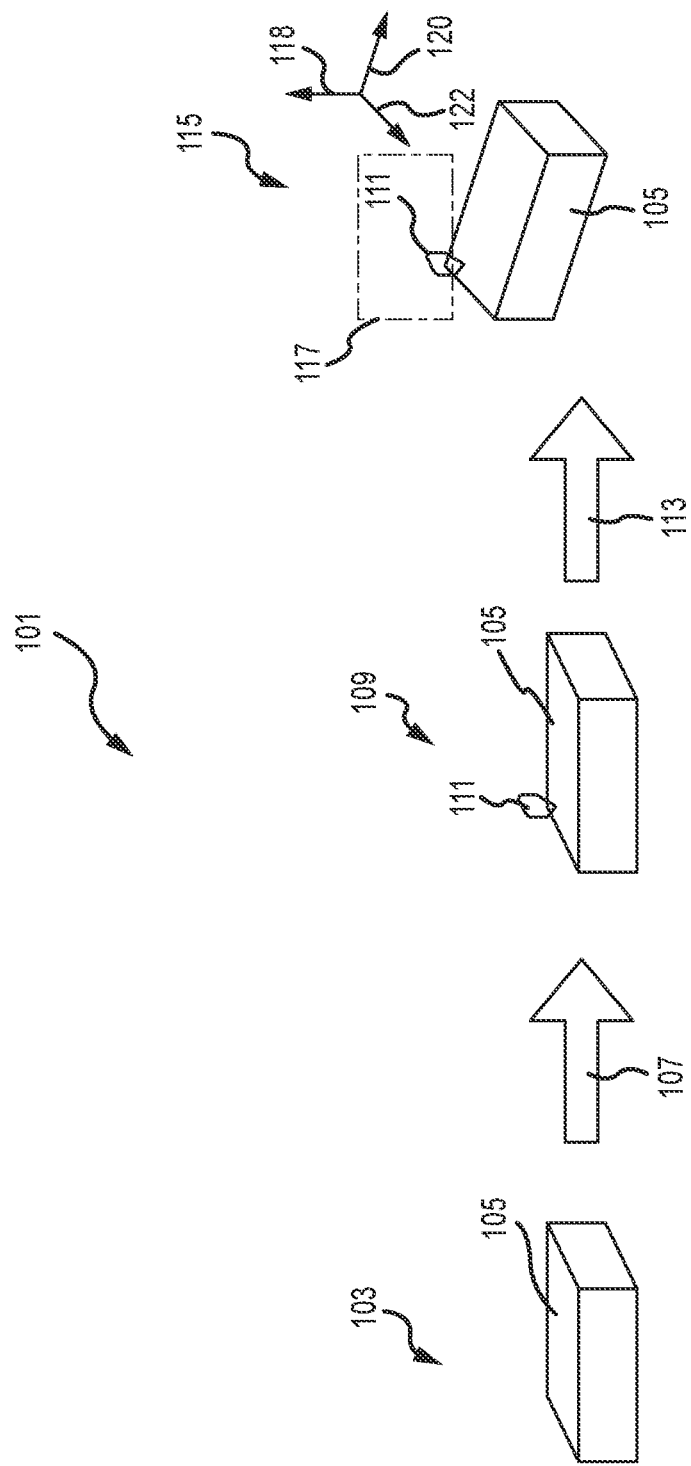
FIG. 1 illustrates stages and/or operations in a process of implementing tethers for facilitating robotic item handling, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The techniques described herein relate to systems that may utilize robotic arms and/or other robotic manipulators to engage and handle packages and/or other items. The items may be subject to operations that may prepare the items for handling by robotic manipulators. In some embodiments, the items may be planned for delivery by a robotic delivery vehicle having a cargo bay, for example. Robotic manipulators may be mounted on or otherwise associated with the robotic delivery vehicles or stations that the robotic delivery vehicles may interface with or visit. In use, the items may be prepared so that the robotic manipulators can readily access and extract or otherwise move or handle the items relative to the cargo bay or other portion of the robotic delivery vehicle or other relevant structure. While the present implementation is discussed with respect to robotic delivery vehicles and associated process flows, and the techniques herein are not limited to this implementation and may be utilized in warehouse environments, fulfillment contexts, or other inventory management settings. In such applications of mobile robotic delivery vehicles, the typical practice of using vacuum pumps with an array of suction tubes to grip a variety of package and product surfaces is prohibitive to a mobile and lightweight system.

To facilitate later robotic handling, packages or other items may be outfitted with a tether. The tether may correspond to a loop of cord or some other suitable structure that can be readily engaged by a robotic manipulator. The tether in some examples may be added to the package during an upstream portion of the process so that a robotic manipulator can readily engage the package in a downstream part of the process, such as for extraction from a cargo bay of a robotic delivery vehicle.

A wide variety of different tether types may be utilized individually or in combination. In some examples, a tether may be formed from adhesive tape. For example, adhesive tape may be used to close the flaps of a box in normal operation. The tape may be formed into a loop to form the tether. For example, a strip of tape may be applied to the first portion of flaps, the tape may be pulled upward and back down to generate a loop, and the tape may be pulled along a second portion of the flaps to continue to seal the package shut and create the tether in the process. The tape may be twisted to provide additional strength or gripping surfaces. The tape may be coupled with a ring or other structure in some examples. The tape may include suitable markings or indicia for facilitating other actions such as punching a hole through a pre marked part of the tape or providing indicia for machine-readable detection to facilitate location of the tether by a robotic manipulator. Other variations of tape tethers may be utilized as well.

In some examples, a tether may be a structure that may be separately attached to a package or item. In some examples, at least a portion of the tether may be mounted on the exterior of an item. Additionally, or alternatively, the tether may extend at least partially through an exterior or external packaging of the item. Some examples may include fasteners that can spread to engage the inside of the packaging upon insertion, corkscrew fasteners, or structures such as cord, cable, or other flexible members that may be weaved or otherwise routed through the exterior of the packaging.

Tethers may be secured by adhesive, by stitching, by clipping, or by any other fastening technique. In some examples, a tether may be releasably coupled. For example, a tether may be attached upstream by an operator and/or machine, engaged for manipulation by a robotic manipulator at a subsequent stage in the process, and removed downstream by actions performed by a different or the same operator and/or machine. Suitable structures and/or process flows can be implemented to facilitate the introduction and/or removal of the tether. In some examples, an operator and/or a coupler machine may attach or install a tether into an installed state relative to a package or other item. In some examples, an operator and/or a decoupler machine may remove a tether relative to an item.

In some examples, a positioner may initially grip or otherwise suitable engage an item and present the item in a suitable position or orientation for attachment of the tether. In some examples, a set of one or more sensors on the positioner (or otherwise suitably situated) may be utilized to determine the center of gravity of the item. The location of the center of gravity may be utilized to determine a suitable placement of the tether. For example, a tether may be situated directly over the center of gravity. In some examples, multiple tethers may be attached, such as on opposite sides of the center of gravity. Suitably placing tethers relative to a center of gravity (such as directly overhead and/or in a set of locations suitably balanced on different sides of the center of gravity) may reduce the likelihood of the tether detaching or the items wobbling or tipping during manipulation by a robotic manipulator. In some examples, one or more tethers may be located at a corner of an item or at another location suitably distant or remote from the center of gravity to allow the item to swing to and/or hang down in a predictable and/or stable orientation that may mitigate against wobbling or tipping during handling of the item.

Any suitable robotic manipulator may be utilized to engage a tether in use. In some examples, a ring arrangement may be utilized. For example, a ring may include an opening or gap that can be moved toward and/or through a tether to cause the tether to enter a space inside the ring through the gap. The ring may be rotated so that the tether is captured at least partially within an area within the ring and facilitate handling by a robotic manipulator to lift or otherwise convey the item to another location. To release the tether, the ring may be rotated again to arrange the gap in a suitable location for the tether to be able to exit through the gap and thereby decouple from the actuator having the ring arrangement. Additionally, or alternatively, robotic manipulators may utilize other actuators and/or end effectors such as forks, prongs, hooks, or other structures that may be suitable for engaging a loop, open hook, or other suitable structure of a tether.

Referring now to the figures in which like reference numbers refer to like elements, FIG. 1 illustrates stages and/or operations in a process 101 of implementing tethers for facilitating robotic item handling according to some embodiments. Some or all of the method or process 101 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

At 103, the process 101 can include accessing an item 105. The item 105 may correspond to a shipping package, for example. Examples can include a box or an envelope. Materials utilized in the item 105 and/or packaging for the item 105 may include cardboard, paper, corrugate, or other durable materials suitable for shipping and/or handling, for example.

The item 105 may correspond to an item within an inventory management system. For example, the item 105 may correspond to an item ordered within an electronic marketplace or other fulfillment system. During at least some stage of the process 101, the item 105 may be present within a fulfillment center or warehouse, for example. The item 105 may include external packaging that may contain an ordered item, multiple ordered items, or other singular or multiple objects.

The process 101 may progress as at 107 to subsequent operations. At 109, the process 101 can include establishing a tether 111. Although the tether 111 is depicted as including a loop, the tether 111 may include a hook, recess, or any other suitable structure for facilitating robotic engagement. The tether 111 can be established in an installed state. In the installed state, the tether 111 may extend from the item 105. Extension and/or placement of the tether 111 may facilitate robotic engagement with the tether 111. Establishing the tether at 109 may include adding the tether 111 and/or moving structure so as to expose and/or reveal the tether. In some examples, the tether may be a preformed component that is added. In some examples, the tether may correspond to a component that is at least partially formed in the process of adding the tether 111. Establishing the tether 111 at 109 may include establishing the tether 111 in a state secured with a shipping package or other item 105 in various examples. Once the tether 111 has been established, the item 105 may be considered a tethered item 105, for example.

The process 101 may progress as at 113 to subsequent operations. At 115, the process 101 can include engaging the tether 111 with a robotic manipulator 117. The robotic manipulator 117 is shown schematically as a block of dashed lines, which may represent that the robotic manipulator 117 may include any suitable robotic end effector for engaging the tether 111. Suitable end effectors for the robotic manipulator 117 may include but are not limited to forks, prongs, hooks, or other structures that may be suitable for engaging a loop, open hook, or other suitable structure of a tether 111. Generally, the robotic manipulator 117 can include, correspond to, and/or be associated with any actuator suitable for engaging the tether 111 and/or imparting motion to the item 105.

Engaging the tether 111 with the robotic manipulator 117 may cause the robotic manipulator 117 to be in an engaged state in which the tether 111 is coupled with the robotic manipulator 117. In the engaged state, the robotic manipulator 117 may be capable of moving the item 105 in response to moving the tether 111. For example, lifting the tether 111 by the robotic manipulator 117 in the engaged state may cause the item 105 coupled with the tether 111 to likewise be lifted. The robotic manipulator 117 may move the item 105 in any suitable direction, such as that illustrated by the vertical axis 118, the width-wise axis 120, and the depth-wise axis 122 (which may correspond to a Z-axis, X-axis, and Y-axis respectively, for example). With the robotic manipulator 117 in the engaged state, item 105 can be conveyed or lifted to any suitable location by the robotic manipulator 117.

Figure 2:
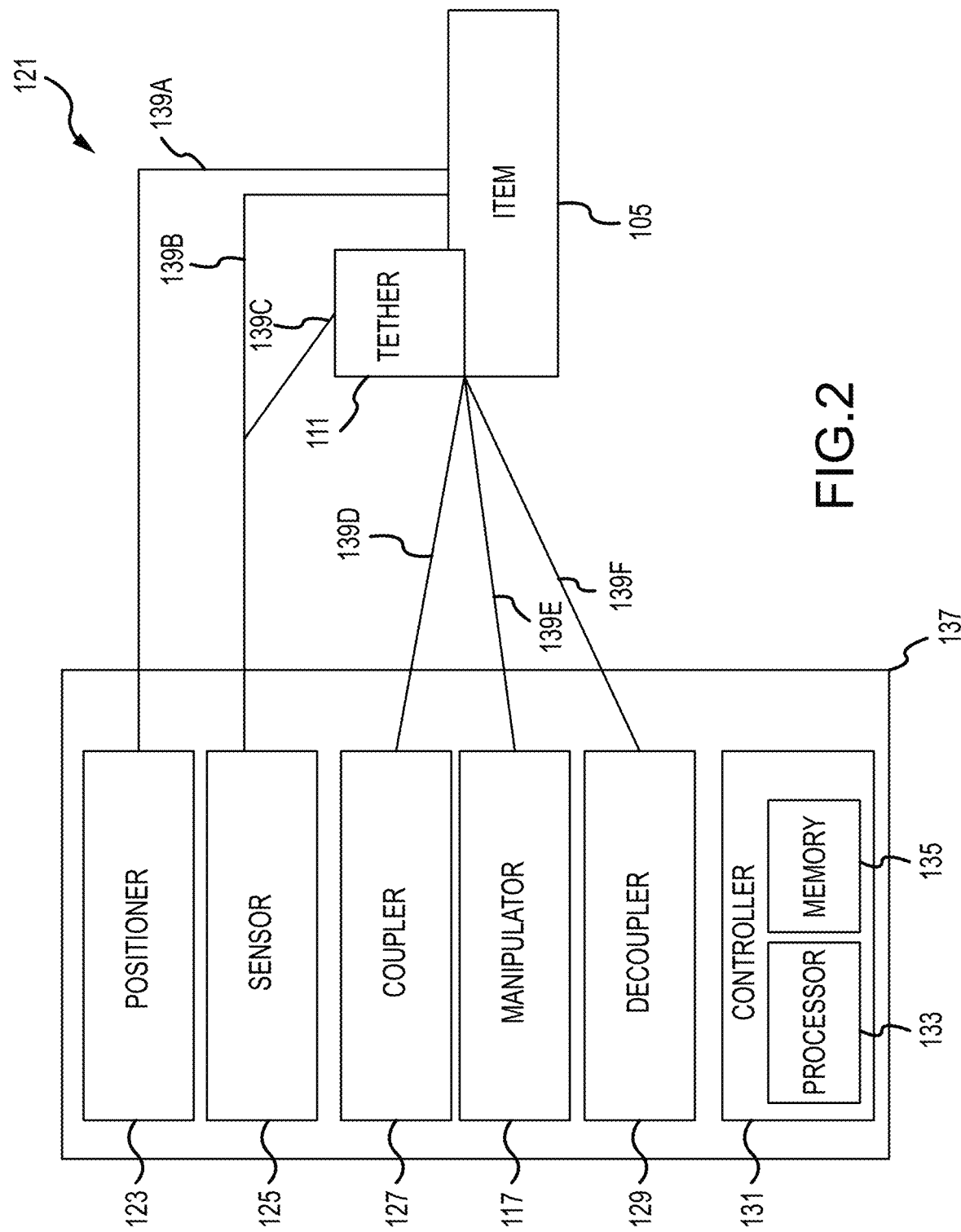
FIG. 2 is a block diagram illustrating components that may be included in a system that may facilitate operation of the method of FIG. 1, in accordance with various embodiments.

FIG. 2 is a block diagram illustrating components that may be included in a system 121 according to various embodiments. The system 121 may correspond to an inventory management system, a robotic delivery system, and/or any other suitable form of system. The system 121 is shown in FIG. 2 with an item 105, a tether 111, a positioner 123, a sensor 125, a coupler 127, a manipulator 117, a decoupler 129, and controller 131, although fewer or more or other components may be implemented. The controller 131 may include a processor 133 and memory 135. Various components may be included in subsystem 137. The subsystem 137 may correspond to components included in or associated with a robotic system, such as elements that may be included in a robotic delivery vehicle (e.g., such as, but not limited to, the example shown in FIG. 3) or otherwise included and/or distributed within a warehouse, a fulfillment center, or other form of environment.

The positioner 123 may be capable of interacting with the item 105, such as is depicted by operative connection line 139A. The positioner 123 may include suitable structure to grip, engage, and/or position the item 105. For example, the positioner 123 may include robotic arms or other robotic assemblies. The positioner 123 may be suitable for orienting the item 105 and/or moving the item 105 to a suitable location for applying and/or establishing a tether 111.

The sensor 125 may include any set of one or more sensors that individually and/or collectively may be capable of providing information about other elements of the system 121. Non-limiting examples may include an optical sensor (e.g., a camera), weight sensors, torque sensors, or other forms of sensors.

The sensor 125 may be capable of interacting with the item 105, such as depicted by operative connection line 139B. In some examples, the sensor 125 may be capable of determining information relative to the item 105. For example, the sensor 125 may be capable of providing information for determining an orientation of the item 105. The orientation of the item 105 may be utilized to facilitate operation of other components relative to the item 105, for example. Additionally, or alternatively, the sensor 125 may provide information indicative of a center of gravity of the item 105. The information indicative of the center of gravity of the item 105 may be used to facilitate placement of the tether 111 relative to the center of gravity, for example. In a non-limiting example, the sensors 125 may take readings from the positioner 123 in different orientations of the item 105, e.g., which may in turn be used to calculate the location of the center of gravity.

Additionally or alternatively, the sensor 125 may be capable of interacting with the tether 111, such as is depicted by operative connection line 139C. The sensor 125 may provide information relative to the tether 111, for example. The sensor 125 may provide information indicative of the location and/or orientation of the tether 111. Information about the tether 111 may facilitate subsequent operations for movement relative to the tether 111 and/or for operations involving the tether 111. In an illustrative example, the sensor 125 may enable computer vision of the tether 111, such as to permit identifying a location of the tether 111 and/or for informing navigation of other components relative to the tether 111.

The coupler 127 may be capable of interacting with the item 105 and/or the tether 111, such as is depicted by operative connection line 139D. The coupler 127 may be utilized to facilitate attachment of the tether 111 to the item 105, for example. The coupler 127 may correspond to any suitable coupler machine or other structure that may be capable of adhering or otherwise securing, installing, coupling, revealing, and/or establishing the tether 111 relative to the item 105. For example, the coupler 127 may be capable of mounting or otherwise establishing the tether 111 in an installed state. The coupler 127 may include robotic assemblies, applicators, adhesives, welders, or any other suitable structures for facilitating establishment of the tether 111.

The manipulator 117 may be capable of interacting with the item 105 and/or the tether 111, such as is depicted by operative connection line 139E. The manipulator 117 may be capable of engaging the tether 111. For example, the manipulator may engage the tether 111 to reach an engaged state with the tether 111. In the engaged state, the manipulator 117 may move the item 105 by movement of the tether 111, for example. The manipulator 117 may be configurable of transitioning to a disengaged state in which the tether 111 is removable or removed from the engagement with the manipulator 117. For example, the manipulator 117 may release the tether 111 or otherwise disengage from the tether 111.

The decoupler 129 may be capable of interacting with the item 105 and/or the tether 111, such as is depicted by operative connection line 139F. The decoupler 129 may be utilized to facilitate detachment of the tether 111 relative to the item 105. The decoupler 129 may correspond to any suitable decoupler machine or other structure that may be capable of unmounting the tether 111 or removing the tether 111 from the installed state relative to the item 105. The decoupler 129 may include robotic assemblies, blades (e.g., to sever tethers), or suitable structure for other decoupling activities (e.g., including but not limited to releasing magnets, clips, switches, etc.). In some examples, the decoupler 129 can additionally or alternatively facilitate disengagement of the manipulator 117 from the tether 111. For example, the decoupler 129 may correspond to a blade or other structure suitable for cutting or severing the tether 111 so that the item 105 may drop away from the manipulator 117 for delivery or placement relative to the manipulator 117. As another example, the decoupler 129 may correspond to an actuator or other structure suitable for pushing or pulling the tether 111 out of engagement with the manipulator 117 so that the item 105 can be released. As a further example, the decoupler 129 may include magnets or any other devices that may unlatch or otherwise modify the tether 111 so that the tether 111 may separate from the manipulator 117 to permit release of the item 105.

The controller 131 can communicate information and/or instructions associated with the system 121. The controller 131 can be in communication with other elements depicted within the subsystem 137 and/or respective components associated with such elements. The controller 131 can communicate via a wired or wireless connection (e.g., Bluetooth). The memory 135 and the processor 133 of the controller 131 can be included in a single structure. However, the memory 135 and processor 133 may be part of a system of multiple interconnected devices.

The memory 135 can include any type of memory device that retains stored information when powered off. The memory 135 can be or include electrically erasable and programmable read-only memory ("EEPROM"), flash memory, or any other type of non-volatile memory. In some examples, at least part of the memory 135 can include a medium from which the processor 133 can read instructions. A non-transitory computer-readable medium can include electronic, optical, magnetic, or other storage devices capable of providing the processor 133 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The processor 133 can execute instructions stored in the memory 135 to perform operations, for example, to enable and/or facilitate operation of other components of the system 121. The processor 133 can include one processing device or multiple processing devices. Non-limiting examples of the processor 133 include a Field-Programmable Gate Array ("FPGA"), an application-specific integrated circuit ("ASIC"), a microprocessor, etc.

The controller 131 can communicate with and send instructions to other elements depicted within the subsystem 137 and/or respective components associated with such elements. The controller 131 can send operating instructions to one or more of the components described herein to enable operation of the system 121, for example.

Figure 3:
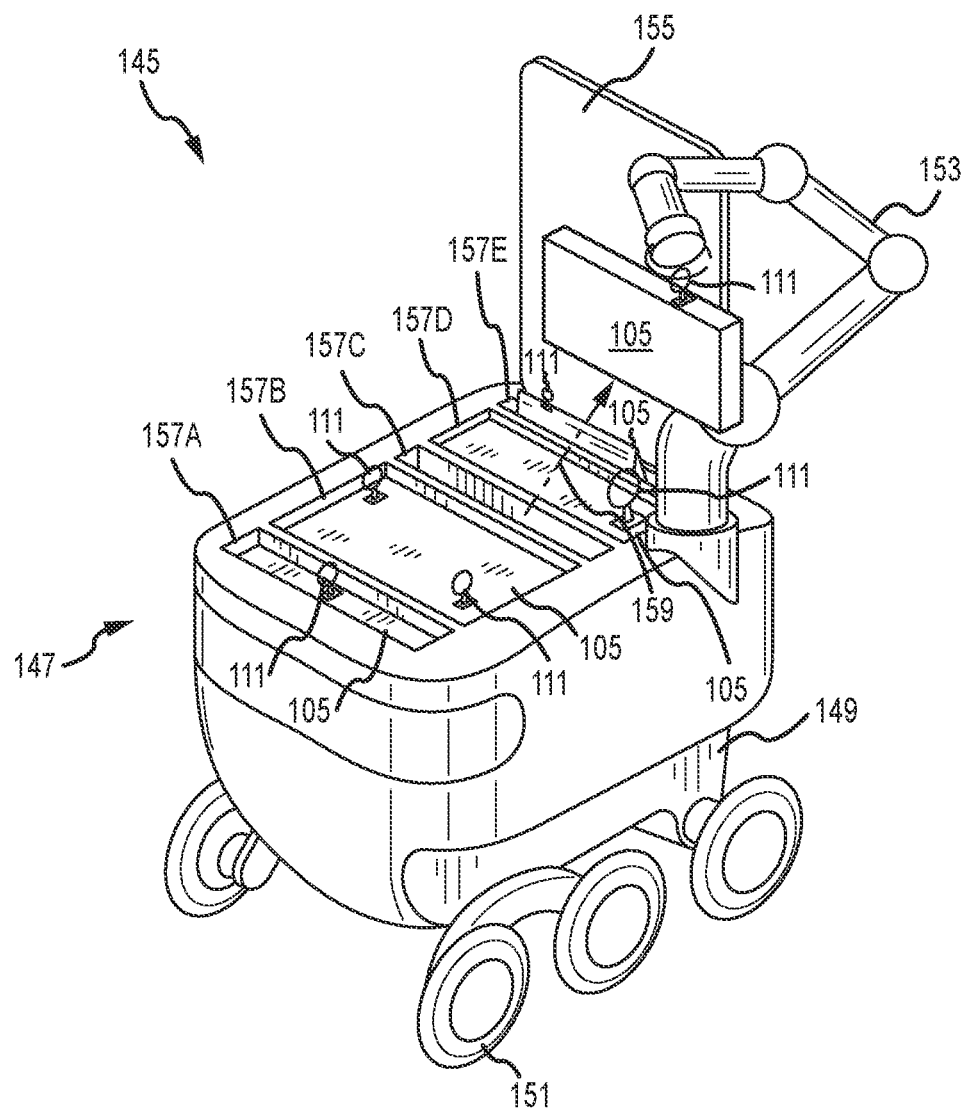
FIG. 3 is a perspective view of an example of a robotic delivery vehicle, relative to which various items with tethers may be implemented, in accordance with various embodiments.

FIG. 3 is a perspective view of an example of a robotic delivery vehicle 145 relative to which various items 105 with tethers 111 may be implemented. The robotic delivery vehicle 145 may include a cargo bay 147 in which one or more items 105 may be received and/or stored. The cargo bay 147 may be supported on a chassis 149 relative to which other features may be coupled or implemented. For example, the chassis 149 may be movable by wheels 151.

The wheels 151 may be coupled with a suitable drive system for propelling the wheels 151 and moving the robotic delivery vehicle 145. Although six wheels 151 are shown, any suitable number of wheels 151 may be utilized. Although wheels 151 are shown, any suitable form of locomotion can be utilized.

The robotic delivery vehicle 145 may include or be associated with a manipulator 153 (e.g., which may be an example of the manipulator 117). Although the manipulator 153 is shown supported by the chassis 149 in FIG. 3, the manipulator 153 may be incorporated into a station or other structure with which the robotic delivery vehicle 145 may interact in operation.

The robotic delivery vehicle 145 may include a lid 155. The lid 155 may hinge or otherwise be movable between open and closed states that allow access into the cargo bay 147.

The cargo bay 147 is shown as subdivided into different berths 157 (e.g., berths 157A, 157B, 157C, 157D, and 157E). Although five berths 157 are shown, any number of one or more berths 157 may be implemented. In some examples, the cargo bay 147 may be provided without being subdivided.

In use, the manipulator 153 may be capable of engaging one or more tethers 111 for respective items 105 received in the respective berths 157. The tethers 111 may be included at any suitable location for the respective items. As a few examples, one item 105 (in the berth 157A) is shown with a tether 111 at the center of the item 105, another item 105 (in berth 157B) is shown with tethers 111 at different locations at opposite corners of the item 105, a further item 105 (in berth 157C) is shown with tethers 111 at one end of the item 115, and another further item (in berth 157E) is shown with a tether 111 along an edge of an envelope forming the item 105. In some examples, information about positioning of tethers 111 may be stored (such as in association with initially forming and/or installing the tether) and accessed to allow the manipulator 153 to be moved to predetermined locations to access or engage tethers 111.

In operation, the manipulator 153 may engage the tether 111 in order to move the item 105, such as to remove an item 105 from a berth 157 (e.g., as depicted by arrow 159) or to locate and/or insert an item 105 into a berth 157 (e.g., opposite arrow 159).

Any suitable robotic manipulator may be utilized. One example is described further with respect to FIGS. 4 and 5.

Figure 4:
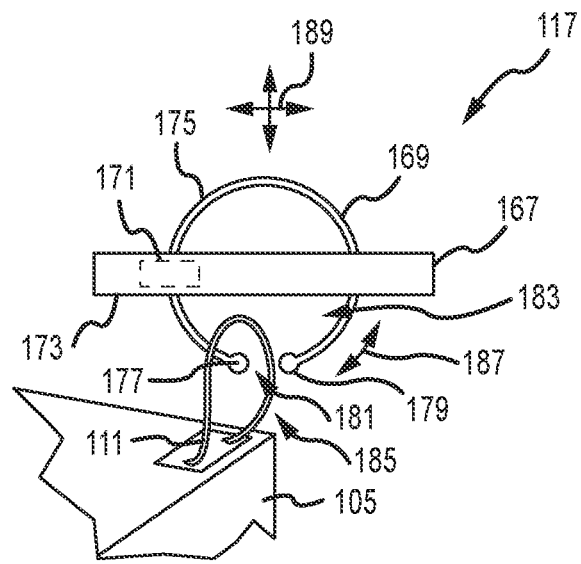
FIG. 4 illustrates an example of a robotic manipulator that may be utilized with tethers, in accordance with various embodiments.

FIG. 4 illustrates an example of a robotic manipulator 165 that may be utilized with tethers 111 herein. In FIG. 4, the robotic manipulator 165 is shown having an actuator body 167, a ring 169, and a drive 171, although more, fewer, or other elements may be included.

The actuator body 167 may include an operative side 173. The operative side 173 may correspond to a side that is to be positioned facing an item 105 and/or tether 111 to be manipulated in use. For example, although the operative side 173 is shown as an underside in FIG. 4, the operative side 173 may correspond to a lateral side, top side, or other particular side or surface of the item 105 and/or tether 111.

The actuator body 167 may correspond to a structure that may be included and/or coupled with a robotic manipulator 117. For example, the actuator body 167 may correspond to a portion of an end effector that may be movable by the robotic manipulator 117.

The ring 169 may be generally C-shaped. The ring 169 may be discontinuous. The ring 169 may be coupled with the actuator body 167.

The ring 169 can include a ring body 175. The ring body 175 may extend between a first end 177 and a second end 179. For example, the ring body 175 may extend in and/or exhibit a curved shape.

The first end 177 and the second end 179 can be spaced apart from one another to define a gap 181. The gap 181 can be arranged as a passage between an interior area 183 and an exterior area 185 outside of the ring body 175. The interior area 183 may be bounded by the ring body 175, for example.

The drive 171 can be arranged to rotate the ring 169. The ring 169 may be rotatable between open and closed states. An example of the open state is shown in FIG. 4, for example. An example of the closed state may be seen in FIG. 5, for example.

Referring further to FIG. 4, in the open state, the ring 169 may be arranged so that the gap 181 is arranged along and accessible from the operative side 173 of the actuator body 167. The ring 169 may be rotated by the operation of the drive 171, such as illustrated by arrow 187. For example, the drive 171 may correspond to a motor, an electrical coil, or any other suitable structure for changing the relative position or orientation of the ring 169 relative to the actuator body 167.

In use, the actuator body 167 may be moved (e.g., as at arrows 189). The actuator body 167 may be moved with the ring 169 in the open state. The actuator body 167 may be moved in a path that causes the gap 181 to cross over and receive a loop or other relevant portion of the tether 111 (or at least a portion thereof) there through. As a result, at least a portion of the tether 111 may be arranged within the interior area 183 bounded by the ring body 175. With the tether 111 suitably positioned relative to the ring 169, the ring 169 can be rotated (as at 187) by the drive 171 to a closed state (such as that depicted in FIG. 5). In some examples, tether 111 includes a biasing component or material that biases the loop in an open position above the item 105 for easier reception by the ring 169.

Figure 5:
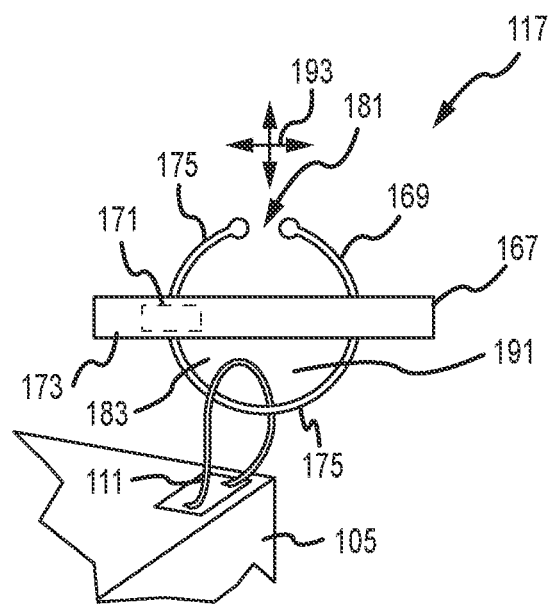
FIG. 5 illustrates an example of a closed state of the robotic manipulator of FIG. 4, in accordance with various embodiments.

FIG. 5 illustrates an example of a closed state relative to the actuator body 167. In the closed state, the ring 169 may be arranged so that the gap 181 is inaccessible from the operative side 173. In the closed state, the ring body 175 may extend continuously to close off a space 191 along the operative side 173.

Moving the ring 169 into the closed state may correspond to engaging the tether 111 with the robotic manipulator 117. Engaging the tether 111 with the robotic manipulator 117 may cause the robotic manipulator 117 to be in an engaged state. In the engaged state, the loop or other relevant portion of the tether 111 may be captured within the interior area 183 bounded by the ring body 175. With the robotic manipulator 117 in the engaged state, the robotic manipulator 117 (e.g., the actuator body 167) may be moved to cause the lifting or conveying of the item 105 (e.g., at arrows 193).

Figure 6:
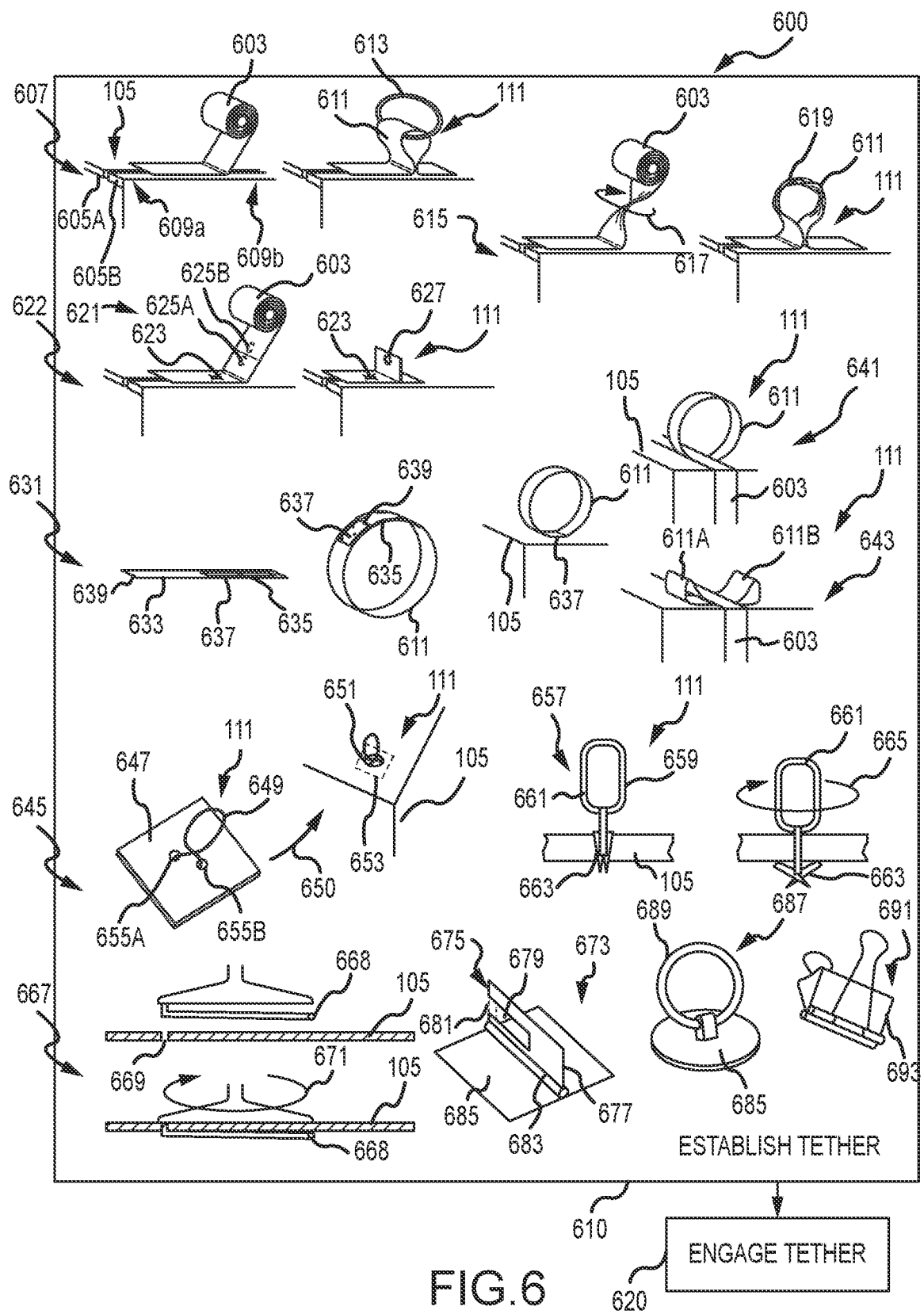
FIG. 6 is a flow chart illustrating a process that may be implemented relative to tethers, in accordance with various embodiments.

FIG. 6 is a flow chart illustrating a process 600 that may be implemented relative to tethers 111. The process 600 at 610 can include establishing a tether 111 and at 620 can include engaging a tether 111.

Generally, establishing the tether 111 at 610 may include using suitable means for adding the tether 111 to the item 105 and/or for revealing the tether 111 relative to the item 105. Various examples of such means are depicted by way of example in FIG. 6, although other suitable structures may also be implemented. Revealing the tether 111 may correspond to pulling back a flap or other structure that may be at least partially concealing and/or covering the tether 111 or pulling a structure up from the underlying item 105 to move the structure into position for corresponding to the tether 111.

Engaging the tether 111 at 620 may include engaging the tether 111 with a robotic manipulator. For example, this may correspond to the robotic manipulator 117 and/or 165 discussed elsewhere herein or any other suitable robotic manipulator, which may include, but is not limited to a fork, hook, or other suitable end effector for engaging the tether 111 in order to lift the corresponding item 105 by or via the tether 111. After moving the item 105 by the tether 111, the robotic manipulator 117 may release and/or disengage the tether 111, such as to deliver the item 105 to a particular location and/or to ready the manipulator 117 for engagement with a different item 105 and/or tether 111.

Turning to some depicted examples of establishing the tether 111 at 610 in FIG. 6, in various examples, the tether 111 may be formed at least partially from an adhesive tape 603. The adhesive tape 603 may correspond to a supply or structure utilized to close a shipping package in some examples. For example, the shipping package may correspond to a box or other enclosure with one or more flaps 605 that may be secured to enclose or close the item or package.

As an illustrative example, at 607, the package or item 105 is shown with a first flap 605A and a second flap 605B. The flaps 605 may be joined along a juncture or seam. The flaps 605 may be a pair of flaps. The flaps may include a first portion 609A and a second portion 609B. The adhesive tape 603 may be utilized by applying the tape 603 along the first portion 609A of the flaps 605 prior to or as part of establishing the tether 111. The tape 603 may secure the first portion 609A of the flaps 605 together. An extra length of the tape 603 may be pulled or drawn away from the package to provide slack with which a loop 611 may be formed. For example, the loop 611 may extend upward between the first portion 609A and the second portion 609B of the flaps 605. The loop 611 may correspond to a suitable structure for the tether 111 to be able to be engaged by a suitable robotic manipulator 117.

In some examples, the loop 611 may be formed around a bracket 613 which may correspond to a hoop or other suitable structure for reinforcing or providing a suitable engagement structure for a robotic manipulator 117. For example, the loop 611 may enclose or capture a part of the bracket 613 there through. In some embodiments, including the bracket 613 can provide additional distance, structure, and/or robustness for engagement. However, in some examples, the bracket 613 may be omitted and the tether 111 may correspond to the loop 611 of the adhesive tape 603 without a bracket 613 included.

A further example utilizing adhesive tape 603 is shown at 615. For example, the adhesive tape 603 when being drawn to form a loop 611 may be turned and/or rotated one or more times (such as illustrated or depicted by arrow 617). Rotating the tape 603 in a drawn state may allow the resulting loop 611 to have a twisted form factor, e.g., with one or more twists 619 in the loop 611. The twists 619 may allow for the tape 603 to be arranged with sticky sides of the tape 603 joined in a fashion that prevents sticky sides from contacting one another and closing the loop 611 or otherwise making the tether 111 difficult to engage with a robotic manipulator 117. Additionally, or alternatively, the twists 619 may provide structural rigidity and/or additional strength compared to an untwisted loop 611 or a loop 611 that lacks the twists 619. In some embodiments, a bracket 613 can be captured by a loop 611 that includes the twist 619.

In some examples, the tape 603 and/or associated components may include indicia 621. For example, as at 622, the tape 603 is shown with a targeting indicium 623 although one or more targeting indicia 623 may be utilized. The targeting indicia 623 may correspond to a suitable fiducial or machine-readable component that may be suitable for providing information about relative location of features of the tether 111 in use. Indicia 621 may be marked on the tether 111 and/or on structures associated with the tether 111 such as the tape 603 and/or the item 105. Including indicia 621 may facilitate the robotic location of the tether 111 through the visual recognition of the indicia 621 in some examples. For example, the indicia 621 (such as the targeting indicia 623) may enable a robotic vision system to readily locate the targeting indicia 623. The targeting indicia 623 may be located at a suitable position that is predetermined and/or known relative to the tether 111 so as to facilitate ready location or targeting relative to the tether 111. Other forms of indicia 621 may be utilized to facilitate non-visual robotic location in some examples. For example, the indicia 621 may correspond to radio frequency identification (RFID) tags, near field communication (NFC) components, or any other component that is machine readable to facilitate determination of location in space. In some examples, handling may be facilitated independent of indicia. For example, information may be electronically encoded into a tether organization head that may be capable of associating items 105 and/or tethers 111 with a customer and/or delivery location, which may facilitate subsequent robotic location of such elements.

Additionally or alternatively, the tape 603 may be formed with or enhanced by one or more indicia 621 that may facilitate further operations for forming the tether 111. For example, formation indicia 625 may be included on the tape 603 and/or added to the tape 603. As an illustrative example, the formation indicia 625A and 625B shown at 623 may correspond to perforations that may be aligned next to one another to enable a punch out to form an opening 627 that may facilitate use of the tape 603 as a tether 111. The formation indicia 625 may correspond to perforated marks, aligning marks, and/or other marks that may be suitable for providing instruction and/or guidance in forming the tether 111 in use.

A further example of forming the tether is shown at 631. A band 633 may be supplied. The band 633 may include adhesives, such as in a first adhesive region 635 and a second adhesive region 637. The first adhesive region 635 and the second adhesive region 637 may correspond to regions of a single adhesive patch or may correspond to separate areas with adhesive that may be separated from one another, for example. In operation, the band 633 may be looped on itself so that an end of the band 633 may be brought into engagement with the first adhesive region 635 and/or along the first adhesive region 635. The second adhesive region 637 may remain exposed upon connecting the band 633 by the end 639 with the first adhesive region 635. The exposed second adhesive region 637 may be used to attach the completed loop to the item 105, for example. As may be best seen at 641, the loop 611 may be further secured by application of adhesive tape 603 or other anchoring structure through an interior of the loop and against the item 105. Additionally, or alternatively, as shown at 643, the loop 611 may be attached by adhesive tape 603 and/or other anchoring structures over a top of the loop 611, which may form multiple loops 611A and 611B. Forming multiple loops 611A and 611B may allow the tether 111 to include multiple connection features for ready engagement by a robotic manipulator 117, for example.

As may be best seen at 645, the tether 111 may include a base 647 and an extension 649. The extension 649 may extend projecting from the base 647. The extension 649 may be suitable for being supplied (e.g., as at arrow 650) as a separate unit that is readily attachable to an item 105 to form a tether 111. The extension 649 and/or base 647 can be installed relative to an item 105 in any suitable manner, which may include introducing it from inside or outside of the item 105.

In some examples, the base 647 may be inserted into an interior of the item 105 and allow the extension 649 to protrude through an aperture 651 in the item 105 and/or packaging of the item 106. The base 647 may be sized to prevent the base 647 from being pulled through the aperture 651, yet may permit pulling through of the extension 649, for example.

In embodiments, the base 647 may be attached to an exterior of the item. For example, the base 647 may be applied in a region 653 on an exterior of the item 105.

In some embodiments, the extension 649 may correspond to a cord, a cable, or another flexible member. In some embodiments, the extension 649 may correspond to a member that may be weaved or otherwise routed through respective openings 655 in the base 647. For example, the extension 649 may exit from a first opening 655A, extend upward, and extend down through a second opening 655B. Opposite ends of the extension 649 may be secured on an underside of the base 647, such as by twisting together, tying, hooking, or otherwise securing along the underside of the base 647.

Similar construction may be utilized to secure or establish a tether 111 relative to an item 105 without the tether 111 being part of a separate assembly installable relative to the item 105. For example, the openings 655 may be arranged through the exterior packaging of the item 105, e.g., rather than through a separate base 647 of an assembly for installing the tether 111.

At 657, another example is depicted regarding a structure that may be used for forming a tether 111 by insertion through the exterior packaging of an item 105. For example, an expandable fastener 659 may be utilized. The expandable fastener 659 may include an engagement portion 661 and an expandable portion 663. The engagement portion 661 may correspond to a loop, hook, or other structure that may be suitable for engagement, such as with a robotic manipulator 117, for example. The expandable portion 663 may be barbed or otherwise suitably formed or shaped to permit insertion through the exterior packaging of the item 105. The expandable portion 663 may expand, such as by pivoting outward such as in response to rotation as illustrated by arrow 665.

A further example is shown at 667 regarding other structures for a tether 111 that may extend through the packaging of an item 105. The anchoring portion may include a corkscrew 668. For example, the corkscrew 668 may be insertable through a small hole 669 and rotated as at 671 to bring the corkscrew 668 through the packaging of the item 105 and into a suitable engagement for sandwiching or otherwise engaging both or either of the upper and lower surfaces of the packaging of the item 105.

Other forms of structure may also be attached for establishing the tether at 610. In some examples, the tether 111 may include a pre-formed structure of plastic or other resilient material. As at 673, in some examples, the resilient material may be arranged to provide a hook 675. For example, the structure may include an upright 677 having a notch 679 that may extend outwardly to an exterior of the upright 677. In some examples, material may be included along an outer edge 681 of the notch 679, e.g., such that the upright 677 may include a closed hole instead of an open hook. The structure may include a hinge 683 to allow movement relative to a base frame 685. Other structures may provide similar functionality. For example, as shown at 687, a ring 689 may be included relative to a base frame 685. Thus, alternative structures for hinging may be provided with similar functionality to the hinge 683 shown at 673.

As a further example, at 691, a clip 693 may be utilized to attach to an envelope or other suitably thin item 105 or a portion of an item 105 that can receive the clip 693. The clip 693 may be capable of releasable attachment such as by attaching by a human operator or by an automated process (such as by operation of the coupler 127) to establish the clip 693 as a tether 111 on an item 105. For example, the clip 693 may include lever arms that may be depressible to open the clip 693 for attachment or detachment, and the lever arms may form loops or other suitable features that may receive parts of robotic manipulators 117 in use to function as a tether 111 by which the item 105 coupled with the clip 693 can be manipulated and/or conveyed by the robotic manipulator 117. In some examples, the clips 693 can be readily removed (such as by an operator or decoupler 129) and re-useable as tethers 111 on other items 105.

Figure 7:
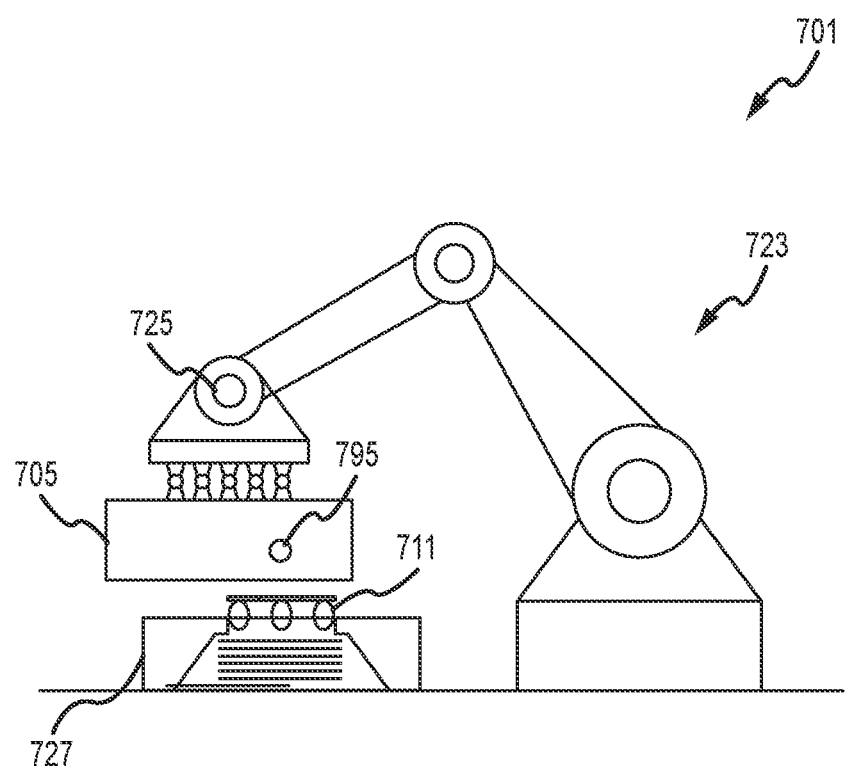
FIG. 7 illustrates a side view of an example arrangement that maybe utilized for applying one or more tethers, in accordance with various embodiments.

FIG. 7 illustrates a side view of an example arrangement that maybe utilized for a tether application. The system 701 is shown with a positioner 723, a set of one or more sensors 725, a coupler 727, an item 705, and tethers 711, all of which may correspond to examples of other elements with similar names and similar ending reference numbers described earlier herein.

In the depicted example in FIG. 7, the positioner 723 may initially grip or engage the item 705 to facilitate subsequent positioning. For example, the positioner 723 is shown with suction cups, although pinchers and/or any other type of end effector and/or actuator may be utilized additionally or alternatively.

The positioner 723 may be outfitted or associated with the sensor 725. The sensor 725 may be capable of taking readings that may be indicative of a center of gravity 795 of the item 705. For example, the sensor 725 may take an initial reading when the positioner 723 is holding the item 705 at an initial position or orientation and may take a second reading when the positioner 723 holds or maintains the item 705 at a second position or orientation. The different readings may be compared to provide information suitable for determining the center of gravity 795 for the item 705.

In operation, the positioner 723 may reposition the item 705 to a suitable position for the application of one or more tethers 711. The positioning may correspond to or be based on the determined center of gravity 795 of the item 705. For example, as shown in FIG. 7, the tethers 711 are shown extending and ready with adhesive sticking up from a coupler 727 so that the tethers 711 will be arranged to be distributed over and/or on multiple sides of the center of gravity 795. Distributing the tether 711 at multiple positions relative to the center of gravity may allow for a robotic manipulator 117 to engage the tethers 711 for subsequent manipulation (such as lifting and/or conveying the item 705)

and/or may reduce an amount of wobble or tipping that may occur during movement of the item 705.

Figure 8:
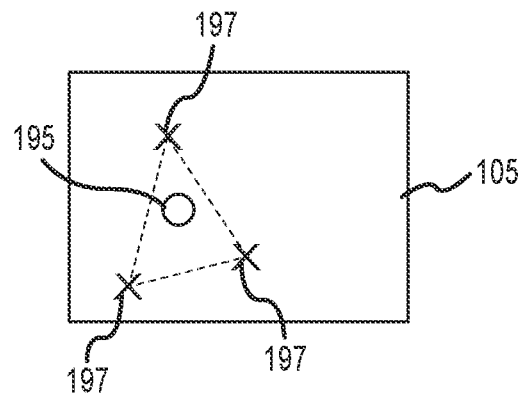
FIGS. 8 and 9 show examples of distributions of tether anchor points relative to the center of gravity of an item, in accordance with various embodiments.
Figure 9:
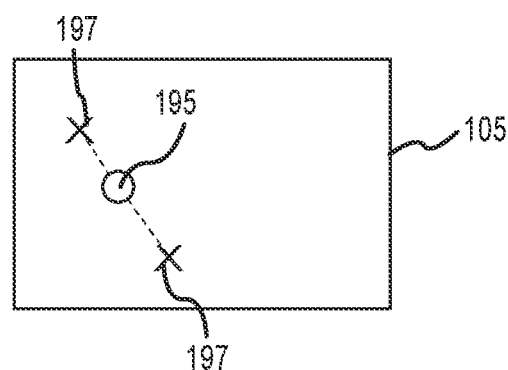

FIGS. 8 and 9 show examples of distributions of tether anchor points 197 relative to the center of gravity 195 of an item 105. Anchor points 197 for tethers 111 may be positioned at any suitable location relative to the center of gravity 195 of an item 105. As one example shown in FIG. 8, anchor points 197 may be positioned on multiple sides around a center of gravity 195 so that the item 105 may be readily manipulated. Another example is shown in FIG. 9, where anchor points 197 are positioned directly opposite one another on either side of a center of gravity 195. One, two, three, or any other number of anchor points 197 may be utilized. In some examples, a single anchor point may be utilized directly over a center of gravity 195, for example. In some examples, two anchor points 197 may be utilized and may be positioned opposite one another on opposite sides of the center of gravity 195 such as to facilitate balance during lifting and avoiding of tipping or twisting or toppling of the item 105. In some examples (such as those shown in FIG. 8, by way of example) three or more anchor points 197 may be utilized to provide additional grip points or a suitable number of grip points to help balance or lift the item without significant amounts of twisting, turning, or other movement of the item 105. Although three anchor points 197 are shown in FIG. 8, more than three may be utilized additionally with any suitable distribution around or over the center of gravity 195. In some examples, an anchor point may be located at a corner of the item 105 or other position away from the center of gravity 195.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating that any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of enabling robotic package handling, the method comprising:
   accessing a shipping package;
   applying an adhesive tape along a first portion of a pair of flaps of the shipping package to secure the first portion of the pair of flaps together;
   establishing a tether in an installed state by adding the tether to the shipping package so as to extend from the shipping package, the tether comprising a loop extending from the exterior of the shipping package, wherein establishing the tether comprises forming the tether from the adhesive tape such that the tether features a twisted form factor in the course of applying the adhesive tape to close the flaps;
   applying the adhesive tape along a second portion of the pair of flaps to secure the second portion of the pair of flaps together;
   accessing a robotic manipulator or end effector comprising:
      an actuator body having an operative side;
      a c-shaped discontinuous ring coupled with the actuator body, wherein the ring comprises a ring body extending in a curved shape between a first end and a second end, wherein the first end and second end are spaced apart from one another to define a gap, and wherein the gap is arranged as a passage between an interior area bounded by the ring body and an exterior area outside of the ring body; and
      a drive arranged and configured to rotate the ring between at least an open state and a closed state, wherein in the open state the ring is arranged so that the gap is arranged along and accessible from the operative side of the actuator body, and wherein in the closed state the ring is arranged so that the gap is inaccessible from the operative side and so that the ring body extends continuously to close off a space along the operative side;

moving the robotic manipulator, with the ring in the open state, in a path that causes the gap to cross over and receive the loop of the tether therethrough so that at least a portion of the loop of the tether is arranged within the interior area bounded by the ring body;

engaging the tether with the robotic manipulator by rotating the ring with the drive to the closed state, wherein engaging the tether with the robotic manipulator causes the robotic manipulator to be in an engaged state in which the loop of the tether is captured within the interior area bounded by the ring body; and lifting or conveying the package by moving the robotic manipulator with the robotic manipulator in the engaged state.

2. The method of claim 1, wherein the moving the robotic manipulator, the engaging the tether, and the lifting or conveying are performed relative to a cargo bay of a robotic delivery vehicle.

3. The method of claim 1, wherein the shipping package comprises a shipping box or a shipping envelope.

4. A method comprising:

accessing an item;

establishing a tether in an installed state so as to extend from the item and facilitate robotic engagement with the tether, wherein establishing the tether comprises forming the tether from adhesive tape such that the tether features a twisted form factor in the course of applying the adhesive tape to close the item;

engaging the tether with a robotic manipulator, wherein engaging the tether with the robotic manipulator causes the robotic manipulator to be in an engaged state in which the tether is coupled with the robotic manipulator; and lifting or conveying the item by moving the robotic manipulator with the robotic manipulator in the engaged state.

5. The method of claim 4, wherein establishing the tether comprises using means for adding the tether to the item.

6. The method of claim 4, wherein establishing the tether comprises securing the tether to an exterior of the item.

7. The method of claim 4, further comprising marking indicia on the tether or on structure associated with the tether so as to facilitate robotic location of the tether through visual recognition of the indicia.

8. The method of claim 4, wherein the engaging the tether with the robotic manipulator comprises engaging with a robotic manipulator comprising:

an actuator body having an operative side;

a discontinuous ring coupled with the actuator body, wherein the ring comprises a ring body extending in a curved shape between a first end and a second end, wherein the first end and second end are spaced apart from one another to define a gap, and wherein the gap is arranged as a passage between an interior area bounded by the ring body and an exterior area outside of the ring body; and a drive arranged and configured to rotate the ring between at least an open state and a closed state, wherein in the open state the ring is arranged so that the gap is arranged along and accessible from the operative side of the actuator body, and wherein in the closed state the ring is arranged so that the gap is inaccessible from the operative side and so that the ring body extends continuously to close off a space along the operative side.

9. An inventory management system comprising:

an item;

adhesive tape arranged closing the item and further forming a tether mounted in an installed state in which the tether is secured with the item to facilitate lifting the item by lifting of the tether, wherein the tether is formed from the adhesive tape such that the tether features a twisted form factor; and a robotic manipulator comprising a robotic end effector engageable with the tether in the installed state, wherein the robotic end effector is configurable to an engaged state in which the tether is coupled with the robotic end effector, and wherein the robotic manipulator in the engaged state is operable to move the item by lifting of the tether in the installed state.

10. The inventory management system of claim 9, wherein the tether comprises a loop.

11. The inventory management system of claim 9, further comprising a coupler machine configured to mount the tether into the installed state.

12. The inventory management system of claim 9, further comprising a decoupler machine configured to at least one of unmount the tether or remove the tether from the installed state.

13. The inventory management system of claim 9, further comprising at least one sensor configured to provide information indicative of a center of gravity of the item to facilitate placement of the tether relative to the center of gravity.

14. The inventory management system of claim 9, wherein the tether is a first tether, wherein the system further comprises a second tether, and wherein the first tether and the second tether are secured with the item on differing sides of a center of gravity of the item.

* * * * *